F. GETTELMAN.
PASTEURIZING APPARATUS.
APPLICATION FILED MAY 10, 1909.
989,141.
Patented Apr. 11, 1911.
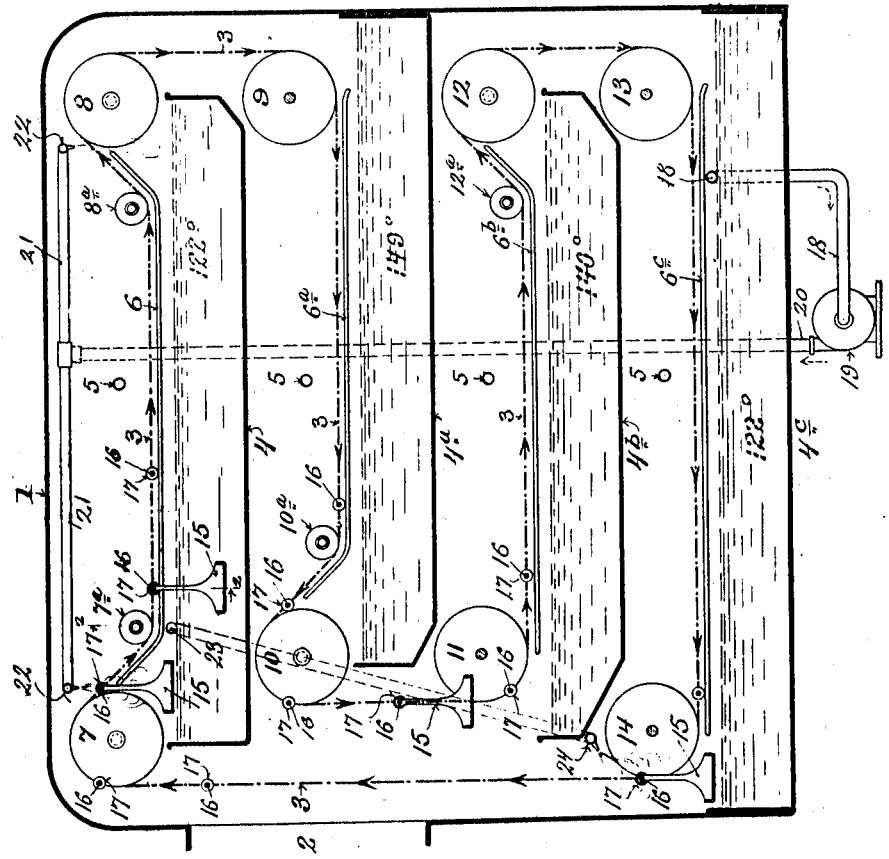

UNITED STATES PATENT OFFICE.

FREDERICK GETTELMAN, OF MILWAUKEE, WISCONSIN.

PASTEURIZING APPARATUS.

989,141.

Specification of Letters Patent.   Patented Apr. 11, 1911.

Application filed May 10, 1909.   Serial No. 495,177.

*To all whom it may concern:*

Be it known that I, FREDERICK GETTELMAN, a citizen of the United States, and resident of Milwaukee, in the county of Milwaukee and State of Wisconsin, have invented certain new and useful Improvements in Pasteurizing Apparatus; and I do hereby declare that the following is a full, clear, and exact description thereof.

The object of my invention is to provide a simple, efficient and economical apparatus for pasteurizing, the construction and arrangement of the apparatus being such that pasteurization is effected by subjecting the bottled product to successive interrupted immersions in water contained in separate vats, the water in each vat being at initial predetermined temperature, whereby said product is gradually brought to the exact pasteurizing temperature desired, at which temperature it is sustained for a period of time and thereafter gradually lowered in temperature preparatory to being removed from the pasteurizing apparatus. Thus it will be understood that by dividing the heated water into separate compartments accuracy in temperatures may be more readily mintained, than in cases where a single vat of heated water is used and the laws of specific gravity depended upon for such temperatures, in which case the product is arranged to pass through the body of water at different elevations therein. In the last named method of sterilizing, the conveyer or chains which carry the bottled product through the sterilizing machine are necessarily subjected to moisture and consequently rust and deteriorate, while with my apparatus the chain or conveyer is supported above the water-line at all times, being dry and susceptible to lubrication, whereby smooth running and durability are maintained.

The invention therefore consists in certain peculiarities of construction and combination of parts as hereinafter fully set forth with reference to the accompanying drawings and subsequently claimed.

In the drawings: Figure 1 is a diagrammatic view of a pasteurizing apparatus embodying the features of my invention, and Fig. 2, a detail cross-section as indicated by line 2—2 of Fig. 1, showing the conveyer-chain and its supporting means.

Referring by characters to the drawings, 1 indicates a housing forming a chamber having an opening 2 therein, that communicates with a vertically disposed well in the forward end of the chamber through which opening access is had to an endless chain conveyer 3, the conveyer being driven and supported by a series of pulleys mounted upon suitable bearings in connection with the housing walls. Suitably supported within the chamber are a series of vats 4, $4^a$, $4^b$, $4^c$, located in their respective order one below the other, the vats being filled to a predetermined height with heated water from supply-pipes 5. Track-rails 6, $6^a$, $6^b$, $6^c$, are disposed above the water-line of the series of vats, which rails serve as longitudinal supporting guides for the chain-conveyer 3. This chain-conveyer is arranged to pass over a pulley 7 located above the forward end of the first vat 4, from which point it is deflected downwardly by a guide-pulley $7^a$, being also supported by an upwardly inclined end of the guide-rail 6, and from the guide-pulley said conveyer travels in the direction of the arrows upon said guide-rail to a second guide-pulley $8^a$ and from thence upward and over a pulley 8, the aforesaid guide-rail being also inclined at this end to form a support for the conveyer intermediate of the last named pulleys, as shown. From pulley 8 the conveyer passes downward to the rear end of the vat 4 over a pulley 9 and lengthwise of the second vat $4^a$, being supported by guide-rails $6^a$ at the forward end of the vat $4^a$, said conveyer passes up an inclined portion of the guide-rail from a guide-pulley $10^a$ to a pulley 10, from which pulley it takes a vertical drop to a pulley 11 disposed over the forward end of the third vat $4^b$. The conveyer passes above this vat in a similar manner to that just described in connection with vat $4^a$, except that it travels in the opposite direction, being passed under a guide-pulley $12^a$ and over a pulley 12 to a pulley 13 above the rear end of the last vat $4^c$. It then travels across the latter, being guided by the rail $6^c$ to a forward pulley 14 and from thence up through the well portion of the chamber to the first pulley 7, this last vertical stretch between the aforesaid pulleys is sufficiently offset from the vertical stretch between the pulleys 10 and 11 to permit all clearance required.

From the foregoing it will be seen that the endless chain-conveyer thus passes in a zigzag manner back and forth over the series of vats being alternately dropped and elevated as it enters and leaves each vat in order to immerse the bottled product in the vat water, which bottled product is carried by a series of trays 15 that are pivotally suspended from rods 16 carried by said chain-conveyer, the rods being provided with anti-friction rollers 17 arranged to contact with the guide-rails. By the above described construction, the several stretches of the aforesaid chain-conveyer are relieved of sagging strain to which they would otherwise be subjected and thus friction being reduced to a minimum a proportionate less amount of power is required to operate the apparatus. The conveyer being set in motion, it is apparent that the trays containing the bottled product will retain their vertical position throughout the entire travel of the conveyer, being immersed in each tank, starting from the first and returning to the starting-point, where said bottled product is removed through the opening of the housing in a perfect state of sterilization.

An overflow-pipe 18 taps the water-line at the rear end of the last vat 4ᶜ of the series, which pipe is connected to a pump 19, the pump being provided with a discharge-pipe 20 connecting a branch-pipe 21 disposed lengthwise of and above the first vat. The branch-pipe terminates with transverse spray-nozzles 22 adapted to discharge their contents at the opposite ends of said first vat 4, whereby the overflow from the last vat 4ᶜ is circulated, there being a gravity overflow pipe-connection 23 leading from the water-line at the forward end of the first vat to a point adjacent to the forward end of the last vat where it terminates in a transverse spray-nozzle 24 arranged to discharge water at a low temperature upon the bottled product as it is lifted from the last sterilizing vat preparatory to being removed from the chamber to be labeled for shipment or consumption.

Assuming the temperature of the water in the first and fourth vats 4, 4ᶜ, to be 122°, the second and third vats 4ᵃ, 4ᵇ, being 149° and 140° respectively. The bottled product, which is at the surrounding atmospheric temperature, just prior to entering the first vat will pass under and be subjected to a spray from the overflow water pumped from the rear end of the last vat, thus increasing the temperature of the product just before the same is submerged. The bottled product is thereafter drawn through the water of the first vat, whereby it is further heated to approximately 113° by the time it is withdrawn therefrom. Thus it will be seen that the water temperature in the first vat will have been materially lowered at its forward end, due to absorption of heat at this point by the lower temperatured bottled product. The water in the rear end of said first vat however will remain at the approximate initial temperature being supplemented by water fed from the rear end of the fourth vat. The product is now passed through the second vat 4ᵃ, being raised thereby to a temperature approximating 140°, and from this vat said product is submerged into the water of the third vat 4ᵇ, and thereby held at approximately the same temperature (140°) for a period of time sufficient to effect perfect sterilization. The product is then introduced into the rear end of the fourth vat 4ᶜ where its temperature is gradually lowered, the water in the rear end of said vat being raised in temperature from its initial 122° due to the equalization between the higher temperature of the bottled product. Hence the overflow water taken from this end of vat 4ᶜ, by the pump is delivered to the first vat above the initial temperature of the water therein, and as the finished sterilized product is lifted from the last tank, lowered in temperature, it is further cooled by the spray bath from nozzle 24, the water from which nozzle is fed from the overflow discharged from the cooled forward end of vat 4.

Thus it will be seen that the sterilizing process consists in a step-by-step gradual rise of the temperature of the product, the rise of temperature being interrupted at intervals until the maximum temperature is reached, at which temperature it is held for a predetermined interval, and thereafter said bottled product is gradually cooled in a reverse step-by-step series of interrupted baths at decreasing temperatures, and by utilizing a series of vats, the temperatures of water therein may be fixed at any degree of heat to produce the most effective results, a condition not attainable wherein a single vat is used and the bottled product raised or lowered therein to effect a sterilization by the temperature of the water at different elevations. Furthermore by interrupting the sterilization of the bottled product in passing from one vat to the other, the sudden shock due to variation in temperature tends more quickly and effectually to render such organisms as sacc. cerevisiae, pediococus, etc., as are found in fermented beverages incapable, it being understood that the apparatus herein described is especially applicable to the sterilization of such beverages.

I claim:

A pasteurizing apparatus comprising a housing having a series of four vats arranged therein one above the other adapted to contain water at progressively higher temperatures from the first vat to the second vat of the series, the third and fourth vats being adapted to contain water at progressively lower temperatures, the water in the first and last vats of the series being approximately at even temperatures, guide sheaves disposed at the ends of each vat, a well at the forward end of the housing communicating with the lower vat, an endless conveyer arranged to pass over sheaves of the first vat under the rear sheave of the second vat and over the forward sheave thereof, under the forward and over the rear sheave of the third vat and under the sheaves of the fourth vat and from thence completing its circuit to the forward sheave of the first vat through the housing well.

In testimony that I claim the foregoing I have hereunto set my hand at Milwaukee, in the county of Milwaukee and State of Wisconsin in the presence of two witnesses.

FREDERICK GETTELMAN.

Witnesses:
  GEORGE G. FELBER,
  N. E. OLIPHANT.